(12) United States Patent
van der Tuijn (10) Patent No.: US 8,018,960 B2
(45) Date of Patent: *Sep. 13, 2011

(54) COMMUNICATION DEVICES, COMMUNICATION SYSTEMS, A BLUETOOTH COMMUNICATIONS PROTOCOL COMMUNICATION DEVICE, AND COMMUNICATION METHODS

(75) Inventor: Roland van der Tuijn, Mouans Sartoux (FR)

(73) Assignee: NXP B.V., Eindhoven (NL)

( * ) Notice: Subject to any disclaimer, the term of this patent is extended or adjusted under 35 U.S.C. 154(b) by 1044 days.

This patent is subject to a terminal disclaimer.

(21) Appl. No.: 11/475,848

(22) Filed: Jun. 27, 2006

(65) Prior Publication Data

US 2008/0293361 A1     Nov. 27, 2008

Related U.S. Application Data (63) Continuation of application No. 09/593,098, filed on Jun. 12, 2000, now Pat. No. 7,095,749.

(51) Int. Cl.
*H04L 12/28*     (2006.01)

(52) U.S. Cl. ........................ 370/412; 370/338

(58) Field of Classification Search .......... 370/328–339, 370/412–413
See application file for complete search history.

(56) References Cited

U.S. PATENT DOCUMENTS

| | | |
|---|---|---|
| 5,343,498 A | 8/1994 | Toy et al. |
| 5,375,119 A | 12/1994 | Koivu |
| 5,400,362 A | 3/1995 | Chennakeshu et al. |
| 5,412,694 A | 5/1995 | Sato et al. |
| 5,469,432 A | 11/1995 | Gat |
| 5,596,726 A | 1/1997 | Thielen |
| 5,663,988 A | 9/1997 | Neustadt |
| 5,913,031 A | 6/1999 | Blanchard |
| 6,064,649 A | 5/2000 | Johnston |
| 6,073,009 A | 6/2000 | van der Tuijn et al. |
| 6,366,622 B1 | 4/2002 | Brown et al. |
| 6,377,541 B1 | 4/2002 | Boetzel |
| 6,377,546 B1 | 4/2002 | Guerin et al. |
| 6,411,611 B1 | 6/2002 | van der Tuijn |
| 6,460,097 B1 | 10/2002 | Harumoto et al. |
| 6,529,519 B1 | 3/2003 | Steiner et al. |
| 6,539,024 B1 | 3/2003 | Janoska et al. |

FOREIGN PATENT DOCUMENTS

GB     2339371 A     1/2000

OTHER PUBLICATIONS

Bluetooth Specification Version 1.0 B, 40 pages, Nov. 1999.*
*Bluetooth Specification Version 1.0; Baseband Specification*; Nov. 29, 1999; pp. 34-86.
*European Standard (Telecommunications series); Digital Enhanced Cordless Telecommunications(DECT); Common Interface(CI): Part 3: Medium Access Control(MAC) layer; ETSI EN 300 175-3 V1.4.2* (Jun. 1999); pp. 1-37, 182 and 203.

(Continued)

*Primary Examiner* — Frank Duong (57) ABSTRACT

Communication devices, communication systems, a Bluetooth communication protocol communication device, and communication methods are provided. According to a first aspect, a communication device includes a single buffer configured to store communication data; control circuitry coupled with the buffer and configured to generate a plurality of packets including different amounts of communication data from the buffer; and communication circuitry coupled with the control circuitry and configured to communicate the packets.a.

11 Claims, 8 Drawing Sheets

OTHER PUBLICATIONS

*VLSI Technology General Release; Communication Products Group; Data Book; DECT Vego-VWS23101 VP40521A; Version 1.01s*; Jun. 13, 2000; pp. i-iv and 1-1-4-3.

U.S. Appl. No. 09/516,619, filed Mar. 1, 2000.

Eur. Telecommunication Standard Institute (ETSI), Radio Equipment and Systems (RES); Digital Enhanced Cordless Tele-Communications (DECT): Common Interface (CI); Part 3: Medium Access Control (MAC) Layer, 2d. (Sep. 1996), pp. 1-200.

* cited by examiner

COMMUNICATION DEVICES, COMMUNICATION SYSTEMS, A BLUETOOTH COMMUNICATIONS PROTOCOL COMMUNICATION DEVICE, AND COMMUNICATION METHODS

This is a Continuation of application Ser. No. 09/593,098, filed Jun. 12, 2000 now U.S. Pat. No. 7,095,749.

TECHNICAL FIELD

The present invention provides communication devices, communication systems, a Bluetooth communication protocol communication device, and communication methods.

BACKGROUND OF THE INVENTION

Conventional cordless telephone configurations include a handset coupled via radio connection with a base station. The base station is usually connected by wire to a traditional Public Switched Telephone Network (PSTN) or an Integrated Services Digital Network (ISDN). The development of new cordless standards which are based upon digital technology provides a broad spectrum of applications. Exemplary cordless applications include wireless Private Automatic Branch Exchange (PABX), wireless Local Area Network (LAN), Telepoint, and Radio Local Loop. Cordless standards include for example Digital Enhanced Cordless Telecommunications (DECT), Bluetooth, GSM, PHS, AMPS, IS54 or IS95. The digital cordless telephones represent a valid alternative to cellular phones in densely populated areas.

DECT is a cordless standard defined as a Multicarrier (MC), Time Division Multiple Access (TDMA)/Time Duplex Division (TDD) system. Tune is divided in the DECT standard into frames of 10 ms. Each frame is divided into 24 full slots. The standard also allows for half slots and double slots of data.

In order to be able to support multiple channels, a DECT base station compresses and transmits 10 ms of speech during one full slot. This means that 10 ms of speech are actually sent over the radio in 416 μs. Every active connection makes use of two slots, one for receiving and one for transmitting. For example, if the slots in a DECT frame are numbered from 0 to 23, the first 12 slots (0-11) are used for transmission from the base station to the handset and the remaining slots are used for handset to base station transmission. A base station transmitting to a given handset in slot N receives from this handset in slot N plus 12, or in other words, half a frame later. Accordingly, a DECT base station is able to support up to 12 active voice connections at the same time.

The total number of bits within a conventional DECT slot is 480. With 24 slots and a 10 ms frame, a gross bit rate of 1.152 Mbits/s is provided. Once the DECT slot has been formatted, it is transmitted using one of 10 radio frequencies specified within the DECT standard. For example, the frequency band assigned to DECT in Europe is between 1,880 and 1,900 MHz, with a spacing of 1.728 kHz between adjacent frequencies. The transmission frequency for each channel is chosen dynamically based upon a Radio Signal Strength Indication (RSSI). Each active slot in the DECT frame may be transmitted and received on any of the 10 frequencies.

In exemplary communication systems, a first communication unit transmits voice samples to its counterpart unit. The TDMA structure is utilized to transmit and receive packets via a radio frequency (RF) channel to implement the exchange of voice samples between the two units. In typical digital communication systems, voice data is typically provided in an 8 kHz sample stream.

In a conventional DECT system, voice is typically carried over a fixed length packet using a single packet length cyclical speech buffer. Such service in DECT is called In_minimum_delay. Such guarantees that every slot in the TDMA structure carries the latest voice data. For this service, offsets within the speech buffer are used to address the latest speech samples to be used by the packet in the TDMA slot. If the voice is transmitted over two packets (e.g. in a handover case) both packets using different slots can use the same speech buffer but with different offsets. In DECT communications, there is no need for an additional buffer when switching form one slot (packet) to another slot (packet).

Figure 1:
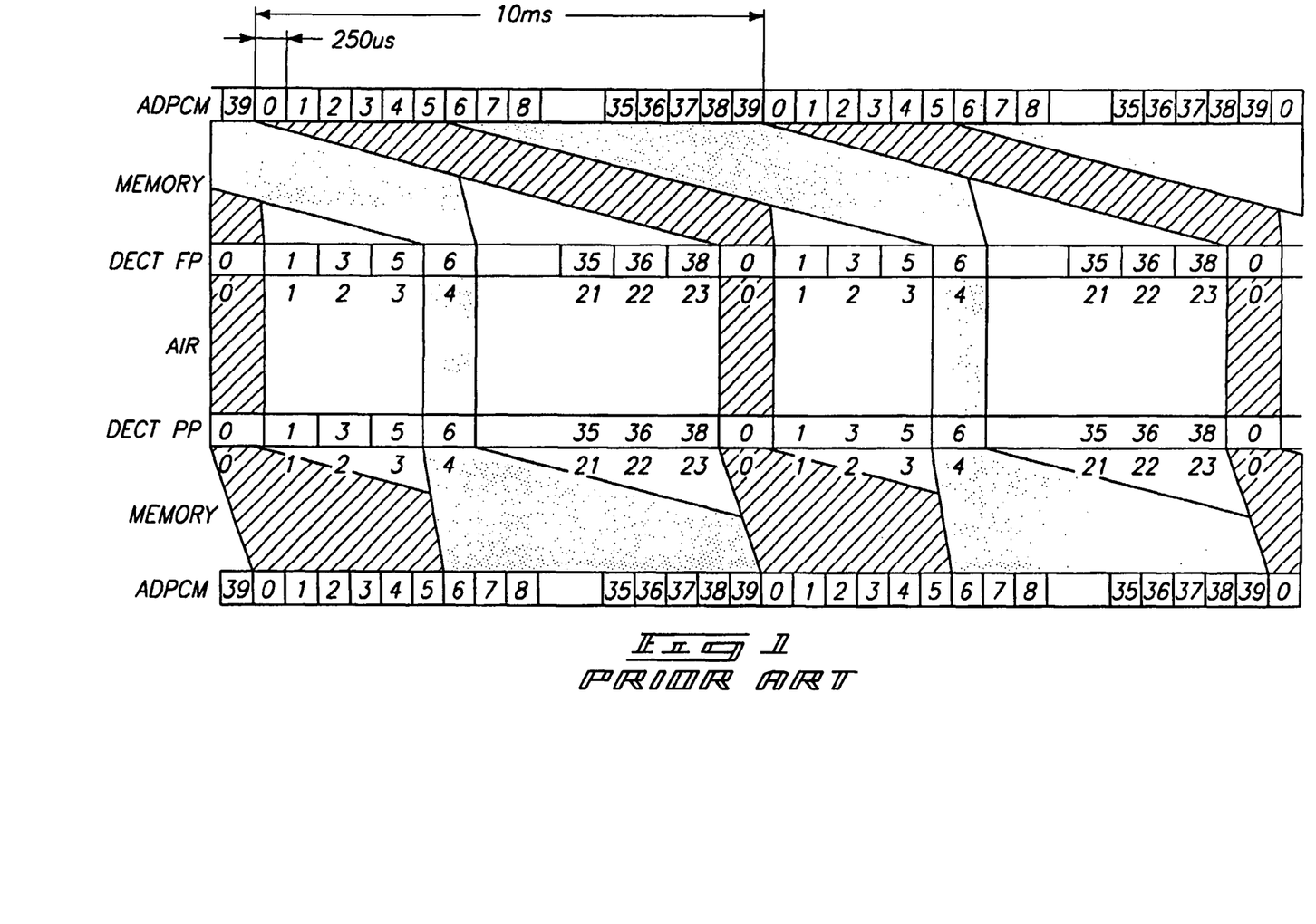
FIG. 1 is an illustrative representation of conventional DECT handover communications.

Referring to FIG. 1, an example of In_minimum_delay handover communications in a DECT system is illustrated. For example, during a handover between two slots (e.g. slot 0 and slot 4), voice data is utilized from a common buffer. However, the data communicated in each slot is different. For example, at the fixed part (FP) ADPCM data samples 0 to 39 are communicated to the portable part (PP) or handset in slot 0 (wherein offset is equal to zero). At the portable part, this data is forwarded to the ADPCM components starting with data 0 (wherein offset is equal to zero). At the time slot 4, the latest data arrives and is sent from the fixed part to the portable part in slot 4. Slot 4 includes data samples 6 to 39 (offset equals 6) which have also been sent in the previous slot 0 and the new ADPCM data 0-5 which arrived during the time between slot 0 and 4. At the portable part, slot 4 (offset equals six) will overwrite the data 6-39 received from slot 0. However, since this is the same ADPCM data there is no difference at the portable part ADPCM side for continuity. At the portable part, ADPCM data from slot 0 and slot 4 will be used depending on which slot has been received last. DECT In_minimum_delay allows voice data to be communicated between a fixed part and portable part irrespective of slot number.

The Bluetooth communication protocol standardizes data synchronization between disparate devices. The aim of Bluetooth communication protocol is to provide a single digital wireless protocol to address end-user problems arising from the proliferation of various mobile devices such as Smart Phones, Smart Pagers, hand held PCs, and Notebooks where it is desired to keep data consistent from one device to another.

According to the Bluetooth communication protocol or standard, it is described that voice packets, with different numbers of speech samples, can be used to transmit voice information. Depending on the number of speech samples in a packet, packets are spaced differently. Such permits selection between voice quality and amount of channel bandwidth used. A voice packet can be switched from one type to another type to permit dynamic selection between quality and bandwidth.

For example, if there are no desired bandwidth limitations, a high quality voice packet (HV1) with a minimum number of speech samples and a high number of added forward error correction (FEC) bits is used. However, when additional bandwidth is needed for other purposes (eg. a second communication channel), a high quality voice packet is switched to a packet with a lower quality (HV2) and lower bandwidth requirements communicating a higher number of speech samples but a lower number of FEC bits.

Figure 2:
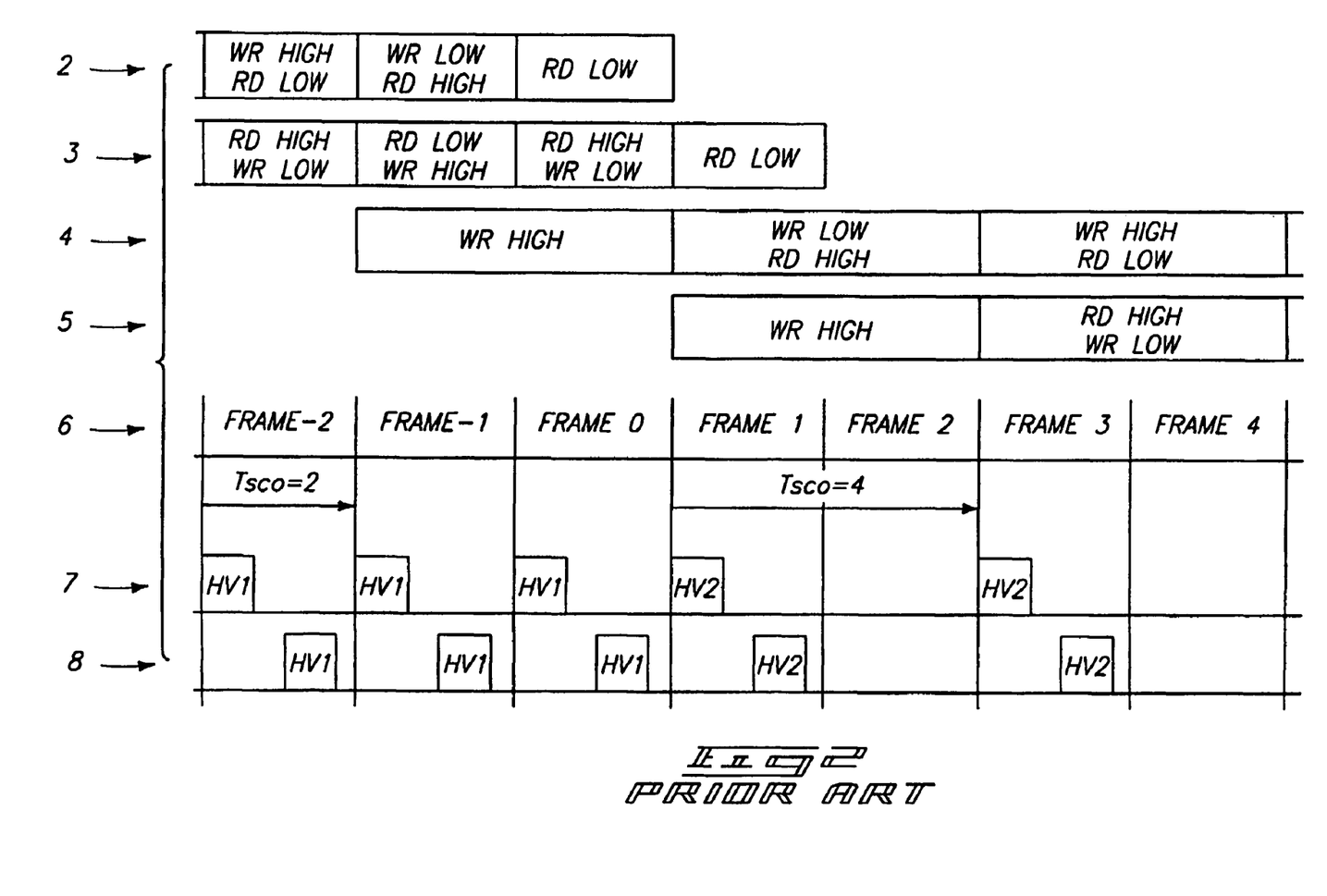
FIG. 2 is an illustrative representation of conventional Bluetooth communications.

Referring to FIG. 2, conventional voice packet switching according to the Bluetooth communication protocol is illustrated. Graph 2 corresponds to accessing data with respect to a high portion and a low portion of a first transmit buffer shown in FIG. 3. Data is written to the buffer from a data side and accessed from the buffer from a packet side in graph 2.

Figure 3:
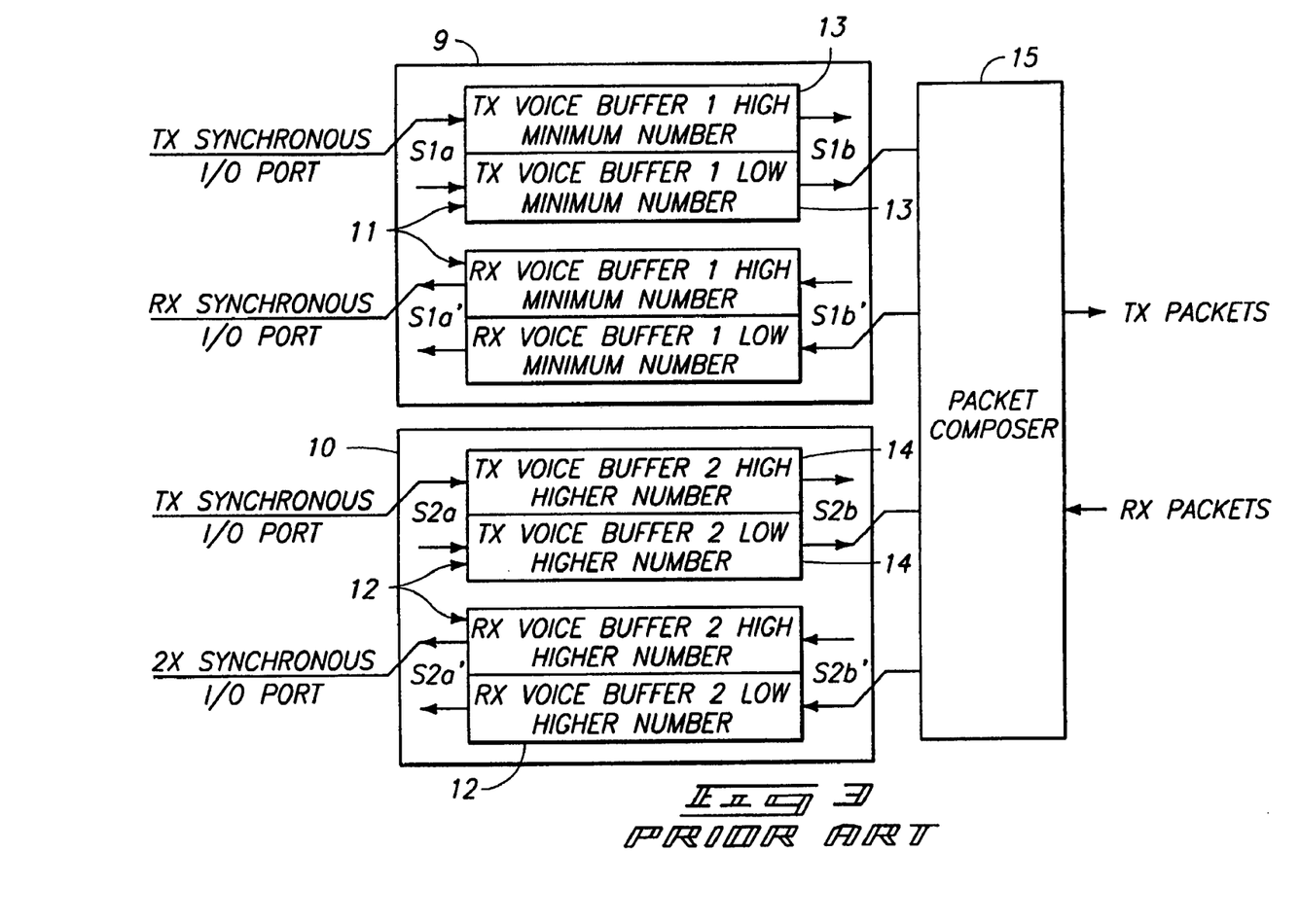
FIG. 3 is a functional block diagram of a conventional buffer arrangement of a Bluetooth communication device.

Graph 3 corresponds to accessing data with respect to a high portion and a low portion of a first receive buffer shown in FIG. 3. Data is read from the buffer from a data side and written to the buffer from a packet side in graph 3.

Graph 4 corresponds to accessing data with respect to a high portion and a low portion of a second transmit buffer shown in FIG. 3. Data is written to the buffer from the port side and read from the buffer to a packet side in graph 4.

Graph 5 corresponds to accessing data with respect to a high portion and a low portion of a second receive buffer shown in FIG. 3. Data is written to the buffer from the packet side and read from the buffer to a port side in graph 5.

Graph 6 represents a TDMA frame structure comprising a plurality of TDD frames for the conventional operations.

Graph 7 represents transmit packets and graph 8 represents receive packets within a Bluetooth device. HV1 packets represent a minimum number of speech samples and a spacing of two slots for TDD frames −2, −1, 0.

For TDD frames 1-4, HV2 packets including a higher number of speech samples and a spacing of four slots are communicated. Such permits available bandwidth for other communications during TDD frames 2 and 4 as shown.

According to the Bluetooth communication protocol, three voice packets are defined using different repetition intervals. For packets HV1, TSCO (the repetition interval between packets) is equal to two and a new packet is started every two slots permitting one communication link. For HV2 packets, TSCO is equal to four wherein a new packet is started every fourth slot providing two communication links. For HV3 packets, TSCO is equal to six wherein a new packet is started every sixth slot providing three possible communication links.

Referring to FIG. 3, the exemplary Bluetooth buffer system is depicted. Two buffers configurations 9, 10 including respective buffer pairs 11, 12 are coupled with a packet composer 15 of an exemplary Bluetooth buffer system. Individual ones of buffers 11, 12 include respective buffer portions 13, 14. Buffer configuration 9 and buffer configuration 10 are coupled in parallel with packet composer 15 and synchronous I/O ports as shown. Conventional operations in FIG. 3 are described herein with reference to transmit operations.

Buffer configuration 9 corresponds to higher quality (HV1) communications while configuration 10 corresponds to lesser quality (HV2) communications. Buffer configuration 9 includes plural discrete buffers 11 individually having a size to hold a given number of data samples to be communicated in an HV1 packet. Buffer configuration 10 corresponds to lower quality communications and includes plural discrete buffers 12 individually having a size to hold more data samples than the number of data samples of buffers 11.

The buffers 11, 12 of respective configurations 9, 10 are used to communicate packets and switching between configurations 9, 10 is utilized to communicate packets having different numbers of data samples. During switching operations intermediate higher quality communications (HV1) and lower quality communications (HV2) buffers 11 and buffers 13 can not be properly aligned and accordingly errors result. Such interrupts speech data and is noticeable to a user.

Speech typically requires a synchronous continuous data channel. Any interruption in the speech data stream will be noticeable by the user in the form of clicks, missing speech, speech deformation, etc. Switching between different buffer configurations to communicate voice packets having different numbers of speech samples introduce interruptions in speech communications resulting in noticeable errors during the communications.

BRIEF DESCRIPTION OF THE DRAWINGS

Preferred embodiments of the invention are described below with reference to the following accompanying drawings.

FIG. 4 is a functional block diagram depicting an exemplary communication system.

FIG. 6A is a functional block diagram illustrating an alternative exemplary buffer configuration according to another aspect of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

According to a first aspect, a communication device comprises: a single buffer configured to store communication data; control circuitry coupled with the buffer and configured to generate a plurality of packets including different amounts of communication data from the buffer; and communication circuitry coupled with the control circuitry and configured to communicate the packets.

A second aspect provides a communication device comprising: a buffer configured to store communication data; control circuitry coupled with the buffer and configured to generate a plurality of packets including communication data from the buffer, the control circuitry being configured to selectively address the buffer using an offset address to extract the communication data for provision within at least some of the packets; and communication circuitry coupled with the control circuitry and configured to communicate the packets.

Another aspect provides a communication device comprising: a buffer so configured to store communication data; control circuitry coupled with the buffer and configured to selectively extract communication data from only a portion of the buffer and to generate a packet including the communication data extracted from only the portion of the buffer, and communication circuitry coupled with the control circuitry and configured to communicate the packet.

Another aspect provides a communication device comprising: a buffer configured to store a given amount of communication data; control circuitry coupled with the buffer and configured to selectively generate a packet including an amount of communication data different than the given amount of communication data; and communication circuitry coupled with the control circuitry and configured to communicate the packet.

According to another aspect, a communication system comprises: a plurality of communication devices configured to communicate with one another, wherein at least one of the communication devices comprises: a buffer configured to store communication data; control circuitry coupled with the buffer and configured to generate a plurality of packets including different amounts of communication data from the buffer; and communication circuitry coupled with the control circuitry and configured to communicate the packets.

Another aspect provides a Bluetooth communications protocol communication device comprising: a cyclical buffer configured to store a maximum amount of communication data to be communicated in a single packet, the communication data comprising a plurality of data samples; a packet composer coupled with the buffer and configured to switch between generation of packets of a first packet type individually including a first amount of communication data from the buffer and of packets of a second packet type individually including a second amount of communication data from the buffer, the packet composer being further configured to extract communication data from only a portion of the buffer for packets of the first packet type selectively using an offset address and the entire buffer for packets of the second packet type, and wherein the packet composer is further configured to extract communication data only from a first portion of the buffer for a first packet of the first packet type and only from a second portion of the buffer for a second packet of the first packet type and only from a third portion of the buffer for a third packet of the first packet type; and wireless communication circuitry coupled with the packet composer and configured to communicate the packets of the first packet type and the second packet type in accordance with a Bluetooth communications protocol.

Another aspect provides a communication method comprising: storing communication data within a single buffer; extracting different amounts of communication data from the buffer; providing a plurality of packets including the different amounts of communication data; and communicating the packets after the providing.

Another communication method comprises: storing communication data within a buffer; selectively addressing the buffer using a given address to extract communication data from at least a first portion of the buffer; selectively offset addressing the buffer using an offset address to extract communication data from a second portion of the buffer; providing a plurality of packets individually including one of the first portion of the communication data and the second portion of the communication data; and communicating the packets after the providing.

Another aspect provides a communication method comprising: storing communication data within a buffer; extracting communication data from only a portion of the buffer; providing a packet including communication data only extracted from the portion of the buffer; and communicating the packet after the providing.

Referring to FIG. 4, an exemplary communication system 20 embodying the present invention is shown. Other configurations of communication system 20 implementing aspects of the present invention are possible.

Communication system 20 operates to transfer data between a plurality of points or locations through the use of a plurality of communication devices 22 and a communication medium. A data signal, also referred to as a data stream, is transferred from a transmitting one of communication devices 22 to a receiving one of communication devices 22. One of communication devices 22 may be referred to as a fixed part, base station or master station and the other of communication devices 22 may be referred to as a portable part, handset or slave station.

Communication signals may be transferred intermediate communication devices 22 via any suitable communication medium. An exemplary communication medium includes communication signals, such as radio frequency (RF) signals and infrared (IR) signals. Communication devices 22 are hardwired in other configurations via a cable, for example. Other arrangements of the invention are possible.

Communication devices 22 are operable to manipulate a digital data stream (e.g., voice, video, etc.) into a plurality of data packets in accordance with the communication protocol or standard being utilized. An exemplary communication protocol is Bluetooth in the described configuration although other protocols are possible. Communication system 20 is configured to transmit data within the packets in accordance with a predefined frame structure as discussed below. In the described configuration, communication devices 22 communicate using a time division multiple access (TDMA) frame structure.

Communication devices 22 of system 20 are configured to communicate using a plurality of communication formats. As used herein, different communication formats refer to communications of respective different packet types. For example, in the described arrangement, communication devices 22 communicate according to the Bluetooth protocol. Such protocol specifies the communication of different packet types (e.g., HV1, HV2, HV3). Communications of HV1 packets refer to communications according to a first communication format, communications of HV2 packets refer to communications according to a second communication format, etc.

Packet types as referred to herein are defined as types of packets which include different amounts of communication data (e.g., different numbers of data samples). In the described embodiment, two packet types HV1 (e.g., higher quality communications with less data samples per packet) and HV2 (e.g., lesser quality communications with an increased number of data samples per packet) according to the Bluetooth standard are described. It is to be understood that other numbers of packet types can be utilized in other aspects of the invention. For example, in accordance with the Bluetooth communication protocol HV3 packets may also be communicated.

The present invention may also be utilized with other communication protocols in addition to Bluetooth wherein different packet types are communicated according to such other protocols.

Figure 5:
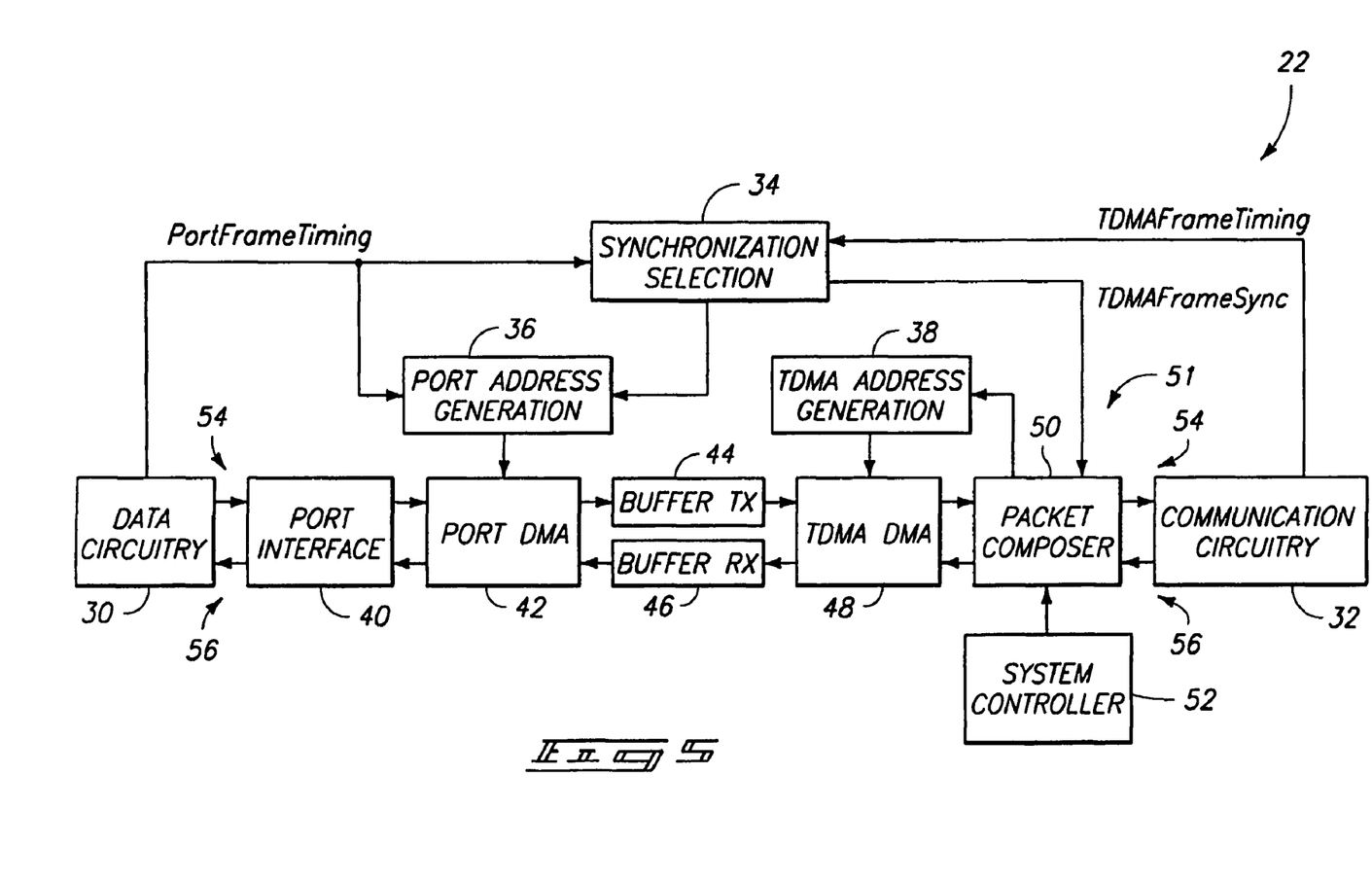
FIG. 5 is a functional block diagram illustrating components of an exemplary communication device of the system of FIG. 4.

Referring to FIG. 5, components of an exemplary communication device 22 are shown. The depicted communication device 22 includes data circuitry 30, communication circuitry 32, synchronization selection circuitry 34, port address generation circuitry 36, TDMA address generation circuitry 38, a port interface 40, port direct memory access (DMA) circuitry 42, a transmit buffer 44, a receive buffer 46, TDMA direct memory access (DMA) circuitry 48, a packet composer 50 comprising control circuitry 51, and a system controller 52.

As shown, plural data paths 54, 56 are provided within communication device 22 intermediate data circuitry 30, and communication circuitry 32. Data path 54 may be referred to as a transmit path and data path 56 may be referred to as a receive data path. Data path 54 communicates data from data circuitry 30 to communication circuitry 32 while data path 56 communicates data from communication circuitry 32 to data circuitry 30.

Port interface 40 operates to communicate data intermediate data circuitry 30 and port DMA 42: Port DMA 42 and TDMA DMA 48 operate to address buffers 44, 46 to access (or extract) data and store data from a port side and a communication side, respectively, of buffers 44, 46.

In the described embodiment, buffers 44, 46 are individually implemented as a single cyclical buffer having a length to hold data for a packet with a longest interval time (e.g., to store the maximum amount of communication data to be communicated in a single packet using communication circuitry 32). Packets HV2 have the longest interval time in the described embodiment with lesser bit (FEC) protection. Other packets (e.g., HV1 packets) are communicated by devices 22 which include an amount of communication data different than the maximum amount stored by one of buffers 44, 46 as described below.

Data circuitry 30 operates to generate data to be communicated using communication circuitry 32 and/or to process data received from communication circuitry 32. In an exemplary embodiment, data circuitry 30 comprises data sampling circuitry which is configured in one exemplary arrangement to provide ADPCM samples of data to be communicated or to generate a continuous data stream from received ADPCM samples. Other configurations of data circuitry 30 are possible.

Communication circuitry 32 is configured to communicate a plurality of data packets including the data samples via an appropriate medium such as a hardwired connection or air. In an exemplary embodiment, communication circuitry 32 includes transceiver circuitry configured to implement either radio 7 frequency or infrared communications. Other communication methods are possible.

Synchronization selection circuitry 34 is coupled with data circuitry 30 and communication circuitry 32. Synchronization selection circuitry 34 operates to implement synchronization of data circuitry 30 and communication circuitry 32. In the described embodiment, synchronization selection circuitry 34 establishes synchronization between data sampling of data circuitry 30 and packet communication using communication circuitry 32.

For example, synchronization selection circuitry 34 receives a PortFrameTiming signal corresponding to frames generated during sampling operations of data circuitry 30. Synchronization selection circuitry 34 also receives a TDMAFrameTiming signal from communication circuitry 32 in the described embodiment.

Synchronization selection circuitry 34 operates to provide synchronization between data circuitry 30 and communication circuitry 32 using such signals. In one embodiment, synchronization selection circuitry 34 is configured to compensate for drift between the PortFrameTiming signal and TDMAFrameTiming signal as described in detail in a U.S. patent application having Ser. No. 09/516,619 filed Mar. 1, 2000, entitled "Communication Devices, Communication Systems and Communication Methods" naming Roland van der Tuijn as inventor, and incorporated herein by reference.

Responsive to the PortFrameTiming signal and the TDMAFrameTiming signal, synchronization selection circuitry 34 operates to output a BufferFrameSynch signal to port address generation circuitry 36 and a TDMAFrameSynch signal to packet composer 50. Packet composer 50 comprises control circuitry 51 configured to control packet generation and reception operations using such TDMAFrameSynch signal for timing.

As described further below, transmit buffer 44 and receive buffer 46 are accessed by both respective port sides and TDMA sides thereof. Synchronization of such addressing is controlled by the BufferFrameSynch signal for the port sides of buffers 44, 46 and the TDMAFrameSynch signal 14 for the TDMA sides of buffers 44, 46. On the TDMA side, control circuitry 51 operates to output a TDMAAddress control signal to TDMA address generation circuitry 38 which provides timing for addressing of respective buffers 44, 46 using TDMA DMA 48.

The origin of synchronization is selected in the described embodiment depending upon the type of application of a particular communication device 22. For example, if the given communication device 22 is a master device (e.g. a DECT base station), synchronization is based upon the PortFrameTiming signal generated from the appropriate data circuitry 30. Thereafter, the BufferFrameSynch signal and the TDMAFrameSynch signal are generated responsive to the PortFrameTiming signal.

Alternatively, if the given communication device 22 is a slave station (e.g. a DECT handset), synchronization is based upon the TDMAFrameTiming signal which in turn is utilized to generate the BufferFrameSynch signal and the TDMAFrameSynch signal.

Synchronization selection circuitry 34 generates the BufferFrameSynch signal comprising a pulse when port addressing should start with an initial value such as 0X00 hex. Thereafter, the addresses for buffers 44, 46 from the port side are incremented at PortFrameTiming pulses (corresponding to data samples).

Addressing of buffers 44, 46 from the TDMA side is aligned with packet timing. The packets are aligned with the TDMAFrameSynch signal. The TDMAFrameSynch signal applied to packet composer 50 determines in which slot a given packet will be communicated and subsequently determines which part of buffers 44, 46 will be addressed corresponding to the respective packets. The timing of addressing of buffers 44, 46 is determined by packet timing in the described embodiment. For example, data is read by TDMA DMA 48 from transmit buffer 44 just before it is needed by packet composer 50 to formulate the packet to be communicated.

Port address generation circuitry 36 and TDMA address generation circuitry 38 are implemented as a counter with a synchronous load in the described embodiment. Output signals from synchronization selection circuitry 34 and packet composer 50 into the respective port address generation circuitry 36 and TDMA address generation circuitry 38 are applied to reload inputs of respective circuits 36, 38.

A TDMAAddress control signal is applied from packet composer 50 to TDMA address generation circuitry 38 and consists of a synchronization signal and an increment signal. For the port address generation circuitry 36, the BufferFrameSynch signal is used as a synchronization signal and the PortFrameTiming signal from data circuitry 30 is utilized as an increment signal.

Figure 6:
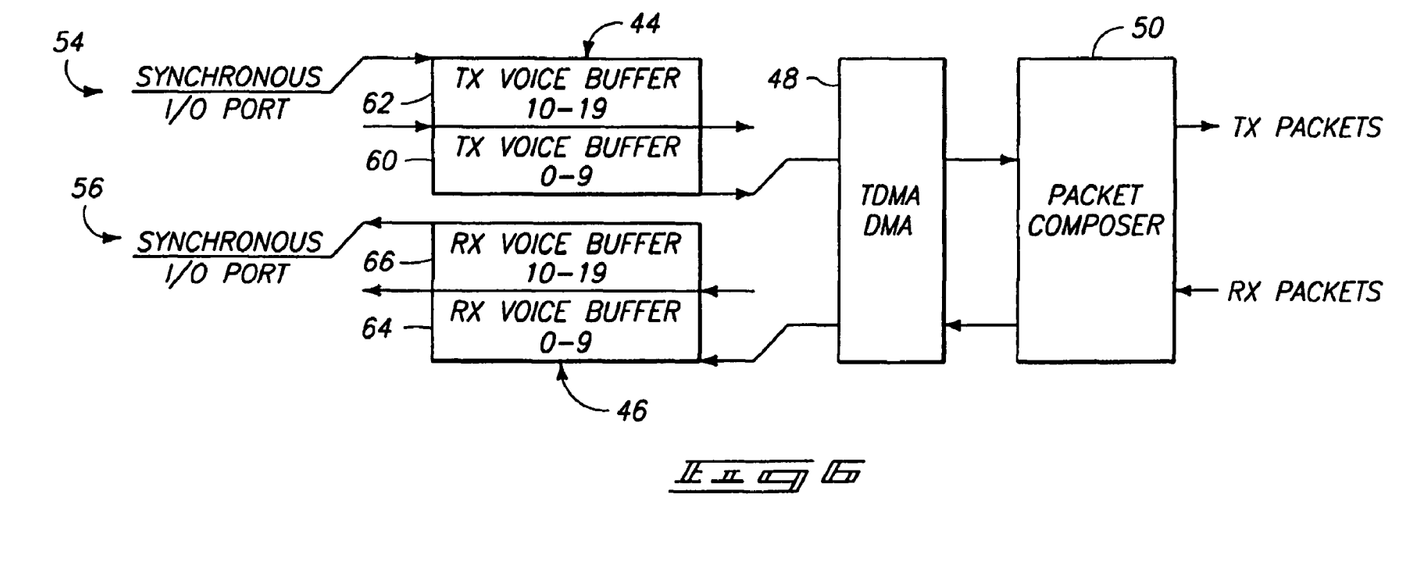
FIG. 6 is a functional block diagram illustrating an exemplary buffer configuration according to an aspect of the present invention.

Referring to FIG. 6, respective buffers 44, 46 individually include a plurality of portions. For example, transmit buffer 44 includes first and second portions 60, 62 and receive buffer 46 includes first and second portions 64, 66. Individual portions 60, 62, 64, 66 correspond to respective storage locations of respective buffers 44, 46. For example, portion 60 corresponds to address locations 0-9, and portion 62 corresponds to address location 10-19 of buffer 44. Portion 64 corresponds to address locations 0-9 and portion 66 corresponds to address locations 10-19 of buffer 46.

For various reasons, it may be desired to communicate packets of different types. A first packet type includes a first amount of communication data (e.g., data samples) corresponding to a given buffer 44, 46 (perhaps from only one of the portions) while a second packet type includes a second different amount of communication data (e.g., data samples) of a corresponding buffer 44, 46 (perhaps from both portions). For example, a first packet type may include a given number of data samples while a second packet type can include another number of data samples.

Depending upon the particular application of communication device 22, it may be desired to communicate data packets of different packet types in different situations. For example, if bandwidth considerations are present, it may be desired to transmit packet types having an increased number of data samples but a decreased number of forward error correction bits. Alternatively, it may be desired to communicate packet types having a reduced number of data samples and increased forward error correction bits to provide enhanced communications.

System controller 52 operates in conjunction with control circuitry 51 comprising packet composer 50 in the described arrangement to select the appropriate packet types for communications. An application using a transmission channel determines a packet type for a voice link. Such could be determined based upon bandwidth requirements, quality of service, and other considerations.

When communication device 22 operates as a master device, system controller 52 determines which packet type to utilize and instruct packet composer 50 which in turn controls appropriate addressing of buffers 44, 46 using TDMA address generation circuitry 38 and TDMA DMA 48. Alternatively, a user may determine which packet type to use via a user interface (not shown) coupled with system controller 52.

In slave implementations of communication device 22, system controller 52 or packet composer 50 identifies which type of packet is being communicated by an associated master and operates accordingly. Alternatively, a slave may also request a given packet type for communications in some applications.

Control circuitry 51 is configured to switch between generation of packets of different packet types including different amount of communication data from a single one of buffers 44, 46 for respective transmit and receive operations. For example, control circuitry 51 is configured to extract communication data from only a portion of transmit buffer 44 for packets of a first packet type and the entire contents of transmit buffer 44 for packets of a second packet type.

Offset addressing (e.g., starting at address 10 of the appropriate buffer) may be selectively utilized to access or store data from only a portion of buffers 44, 46. Using TDMA address generation circuitry 38 and TDMA DMA 48, control circuitry 51 selectively offset addresses buffers 44, 46 from the data or packet side. For example, control circuitry 51 implements such offset addressing to extract communication data from second portion 62 of buffer 44. In such an example, control circuitry 51 offset addresses using an address of 10 to address portion 62 of buffer 44. Further, circuitry 36 and port DMA 42 may similarly implement offset addressing from the port sides of buffers 44, 46.

Control circuitry 51 is also configured to extract communication data only from a first portion of transmit buffer 44 (e.g. portion 60) for a first packet of a first packet type and only from a second portion of transmit buffer 44 (e.g. portion 62) for a second packet of the first packet type. In such an arrangement, control circuitry 51 addresses portion 60 for one packet of a first packet type and offset addresses second portion 62 for another packet of the first packet type.

Referring to FIG. 6A, alternative configurations of buffers 44a, 46a are shown. Such are configured to provide communications using three packets using different repetition intervals (e.g., packets HV1, HV2, HV3 and respective TSCO=2, 4, 6 for Bluetooth communications). The depicted buffers 44a, 46a individually comprise three buffer portions having respective addresses and which are individually addressable for respective packets (e.g., HV1, HV2, HV3). Other configurations of buffers 44, 46 are possible having, for example, other numbers of respective buffer portions. Further, the portions of a given buffer may comprise different sizes.

Figure 7:
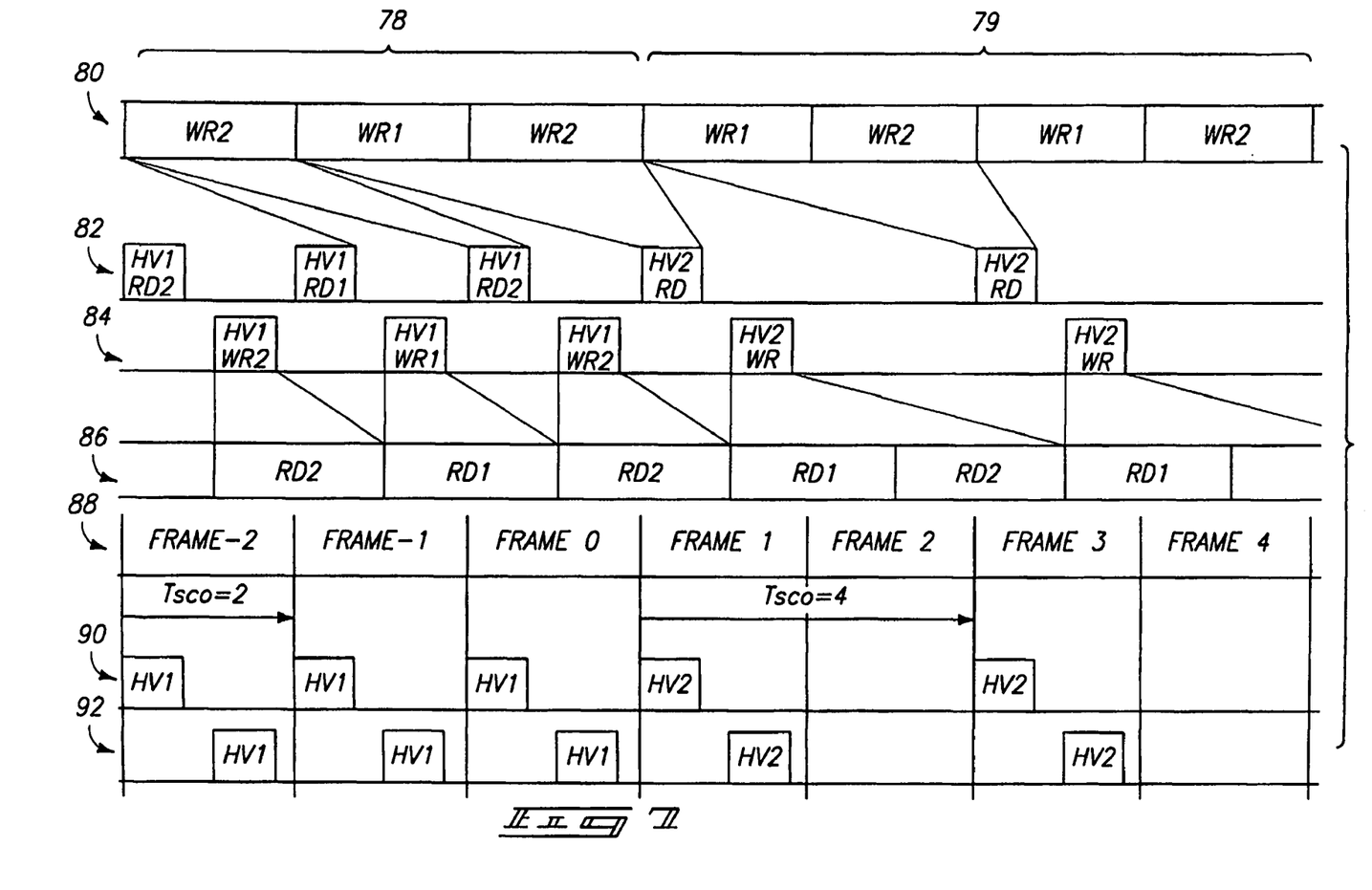
FIG. 7 is an illustrative representation of communications intermediate communication devices of the system according to aspects of the present invention.

Referring to FIG. 7, data flow intermediate data circuitry 30 and communication circuitry 32 in accordance with aspects of the present invention is described. The graphs of FIG. 7 are related in time which progresses from left to right.

Graph 80 represents transmit data being written to transmit buffer 44 from port DMA 42. WR1 and WR2 represent data written to respective portions 60, 62 of buffer 44.

Graph 82 represents transmit data accessed or extracted from transmit buffer 44 for appropriate packets. HV1 RD1 and HV1 RD2 correspond to packets of a first packet type having data from buffer portions 60, 62 of buffer 44. HV2 RD correspond to packets of a second packet type having data from both portions 60, 62 of buffer 44.

Graph 84 represents data written into receive buffer 46 from appropriate packets. HV1 WR1 and HV1 WR2 correspond to packets of a first packet type having data for respective portions 64, 66 of buffer 46. HV2 WR correspond to packets of a second packet type having data for both portions 64, 66 of buffer 46.

Graph 86 represents data extracted from buffer 46 by port DMA 42. RD1 and RD2 represent data extracted from respective portions 64, 66 of buffer 46.

Graph 88 represents a TDMA structure including a plurality of TDD frames used for communications via communication circuitry 32.

Graph 90 represents transmit data packets generated using packet composer 50.

Graph 92 represents packets received within packet composer 50 from communication circuitry 32.

The packet generation in the described embodiment allows the number of data samples such as speech samples to be communicated in respective packets to be different. A cyclical buffer principle works because the packet side accesses samples with respect to buffers 44, 46 of FIG. 6 in fast bursts, where the I/O port side accesses periodically. For example, for buffer 44, a sample 0 will be read by a packet just before a new sample is written at the same address by the I/O port side. For receive buffer 46, a packet will write a sample 0 just before it is read by the I/O port side. The packet side accesses the number of samples in line with the packet communication, whereas the I/O port side communicates samples at regular intervals. The number of samples in the packet are communicated in a shorter time, hence in fast bursts, than the same number of samples communicated at the I/O port side.

As shown in FIG. 7, communications occur during a time period 78 according to the first communication format and during another time period 79 according to the second communication format. In the described exemplary embodiment, first format communications refer to higher quality Bluetooth communications (HV1 packets) and second format communications refer to lesser quality Bluetooth communications (HV2).

During transmit operations of first format communications (e.g., high quality communications using HV1 packets), a portion of buffer 44 is written to from the port side during a given frame, while the same portion is being read by the communication side during such given frame. Such is shown in FIG. 7 for example wherein data is written to second portion 62 of transmit buffer 44 (represented by WR2 in graph 80) while data from second portion 62 is read into a packet HV1 (represented by HV1 RD2). Such continues for both first portion 60 and second portion 62 during the high quality communications during time period 78.

As described above, the packet side (also referred to as the communication side) accesses samples within the respective buffers 44, 46 in fast bursts, where the port side accesses are on a regular interval. For example, during transmit communications, data (e.g., such as a data sample 0) will be read by a packet just before a new data is written at the same address by the port side.

During receive operations of the first format communications, (e.g., HV1 packet communications), second portion 64 is written to from the communication side during a given frame, while second portion 64 is being read by the port side during such given frame. In the depicted example, receive frame references of receive buffer 46 are shifted in time relative to transmit frame references of transmit buffer 44 and the TDMA frame reference 4 of graph 88).

As shown in FIG. 7, data is written from a packet to second portion 64 of receive buffer 46 (represented by HV1 WR2 in graph 84) while data 7 from second portion 62 is read by the port side (represented by RD2 in graph 86). Such continues for both first portion 64 and second portion 66 of buffer 46 during the high quality communications as shown. During to receive communications, data is written from a packet (e.g., such as data sample 0) just before it is read by the port side.

At a moment in time intermediate frame 0 and frame 1 of graph 88 corresponding to time portions 78 and 79, system controller 52 switches communications from a high quality voice link (HV1 packet type) to a lesser-quality voice link (HV2 packet type) with less bit protection than the high-quality voice link. Other communications via another link are possible during frame 2 and frame 4 during the second format communications period 79 as shown.

During transmit operations of second format communications (HV2 packets), first portion 60 of transmit buffer 44 is written to by the port side during a given frame (WR1) and first portion 60 and second portion 62 are both read by the packet side for provision in a packet (represented by HV2 RD). During a subsequent frame, the second portion 62 of transmit buffer 44 is written to by the port side (WR2) while no data is accessed by the communication side.

Thereafter, in a following frame, first portion 60 of transmit buffer 44 is again written to by the port side (WR1) and first portion 60 and second portion 62 are both read by the communication side for provision in a another packet HV2 RD. Such is repeated as illustrated during second format communications.

During receive operations of the second format communications, first portion 64 and second portion 66 of receive buffer 46 are written to by the packet side using data from a given packet (represented by HV2 WR) during a given frame while first portion 64 and second portion 66 are both read by the port side during the given frame (RD1) and a subsequent frame (RD2). Such is repeated during the remaining second format communications. No data is written during such subsequent frame as shown.

The arrangement of the present invention provides communication of voice using different packets types having different amounts of communication data or data samples. Aspects of the present invention provide a single buffer for transmit communications and a single buffer for receive communications and the transmit buffer and the receive buffer individually allow seamless switching between communication of the different packet types. The present invention provides such switching without interruption of data such as speech information.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A communication device comprising:
a buffer configured to store communication data comprising a plurality of speech samples having different numbers of data samples and more than one type of communications quality;
control circuitry coupled with the single buffer and configured to selectively extract the communication data from only a portion of the single buffer and to generate a packet including the communication data extracted from only the portion of the buffer; and
communication circuitry coupled with the control circuitry and configured to communicate the packet.

2. The device of claim 1, wherein the control circuitry is further configured to generate a plurality of packet types and to extract the communication data from only the portion of the single buffer for one packet type and the entire single buffer for another packet type.

3. The device of claim 1, wherein the control circuitry is further configured to switch between generation of a first packet type including a first amount of the communication data and another packet type including a second amount of the communication data.

4. The device of claim 1, wherein the control circuitry is configured to switch between generation of different packet types, including respective different amounts of the communication data.

5. The device of claim 1, wherein the control circuitry is configured to extract the communication data only from a first portion of the single buffer for a given packet and only from a second portion of the single buffer for another packet.

6. The device of claim 1, wherein the control circuitry is configured to offset address the single buffer to extract the communication data from only the portion of the single buffer.

7. The device of claim 1, wherein the communication circuitry comprises wireless communication circuitry.

8. A communication method comprising:
storing communication data within a buffer, the communication data comprising a plurality of speech samples having different numbers of data samples and more than one type of communications quality;
extracting, by control circuitry coupled with the single buffer, the communication data from only a portion of the single buffer;
providing a packet including the communication data only extracted from the portion of the single buffer; and
communicating, by communication circuitry, the packet after the providing step.

9. The method according to claim 8, further comprising:
extracting the communication data from the entire single buffer; and providing a packet including the communication data extracted from the entire single buffer.

10. The method according to claim 8, wherein the extracting step further comprises:

selectively addressing the single buffer using an offset address.

11. The method according to claim 8, wherein the extracting step further comprises:

extracting the communication data from one of a first portion of the single buffer and a second portion of the single buffer; and the providing step further comprises:

providing the packet, including the communication data, from the first portion of the single buffer, and providing another packet, including the communication data, from the second portion of the single buffer.

\* \* \* \* \*